Feb. 9, 1943.   B. R. EDWARDS   2,310,224
BISCUIT CUTTING DEVICE
Filed April 20, 1940
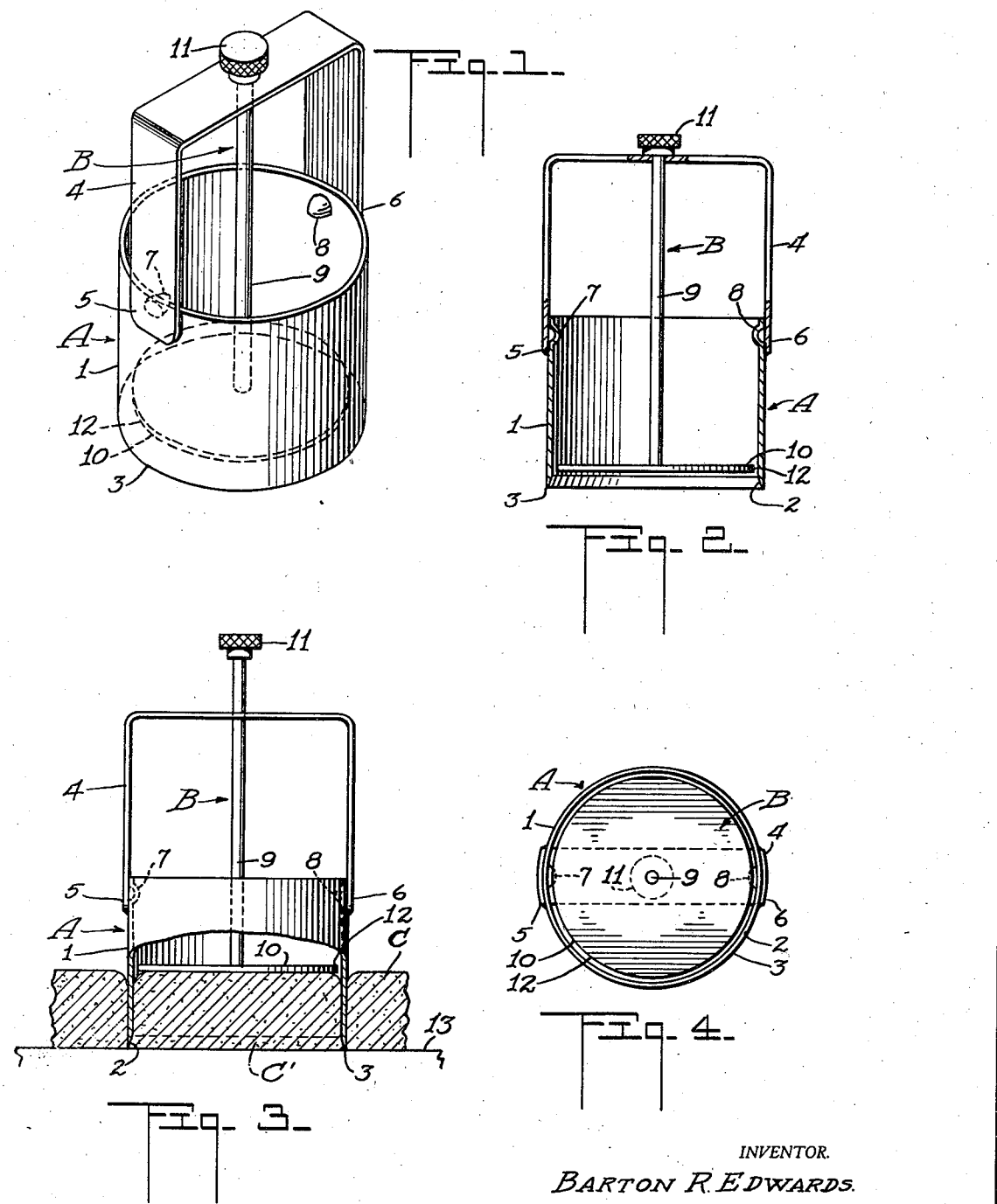
INVENTOR.
BARTON R. EDWARDS.
BY
ATTORNEYS.

Patented Feb. 9, 1943

2,310,224

UNITED STATES PATENT OFFICE 2,310,224

BISCUIT CUTTING DEVICE

Barton R. Edwards, Berkeley, Calif.

Application April 20, 1940, Serial No. 330,741

2 Claims. (Cl. 30—130)

The present invention relates to improvements in a biscuit cutting device, and it consists of the combinations, constructions and arrangements hereinafter described and claimed.

An object of my invention is to provide a biscuit cutting device that is adapted for cutting biscuits or the like, and for placing the cut biscuits in the pan in which they are to be baked. My invention has particular reference to a biscuit cutter which has an ejector associated for facilitating the removal of the cut biscuit from the cutter.

It is proposed in this invention to provide a tubular cutting member with a cutting edge formed by chamfering the inner wall of the lower end of the tube. A U-shaped handle is secured to the upper end of the tubular member and slidably carries a plunger rod, which in turn supports a dough-ejecting disc. The periphery of the latter is slightly spaced from the inner surface of the tubular member for permitting air to escape through an annular space during movement of the tubular member into the dough.

The plunger rod lies midway between the sides of the loop that forms the handle and permits the index finger and the middle finger of the operator to straddle the rod when using the device and the thumb of the same hand is therefore positioned to press the rod for ejecting the cut dough.

A still further object of my invention is to provide a device of the character described, which is simple in construction, durable and efficient for the purpose intended.

Other objects and advantages will appear as the specification proceeds, and the novel features of the invention will be set forth in the appended claims.

My invention is illustrated in the accompanying drawing, forming part of this application, in which:

Figure 1 is an isometric view of the device;

Figure 2 a vertical section therethrough, the dough-ejecting mechanism being shown in elevation;

Figure 3 a side elevation of the device shown cutting through a layer of dough, the lower portion of the tubular member being illustrated in section; and Figure 4 a bottom plan view of the device.

In carrying out my invention, I provide a combined shaper and cutter indicated generally at A. The cutter is tubular and may be of any shape desired. I have shown the cutter as being in the shape of a tubular member 1, cylindrical in cross-section. The lower edge of the member has its inner surface chamfered at 2 to provide a cutting edge 3. A U-shaped handle 4 has its ends secured to the tubular member at 5 and 6 by any suitable means, such as soldering, spot-welding or riveting. Stops 7 and 8 are formed near the top of the tubular member in the shape of inwardly-extending projections. It will be understood, of course, that any other suitable stops could be provided. The purpose of these stops will be set forth hereinafter.

The dough ejector is shown generally at B and comprises a plunger rod 9 that is slidably mounted in an opening formed in the center of the handle (see Figure 2). A disc 10 is secured to the lower end of the rod 9, and a knob 11 is disposed at the top of the rod. Figures 2, 3 and 4 clearly show the periphery 12 of the disc as being spaced inwardly from the inner surface of the tubular member 1. Figure 4 illustrates the space between the disc 10 and the member 1 as being annular.

The knob 11 permits the rod 9 to be manually moved downwardly toward the cutting edge of the member, and the knob acts as a stop for limiting the downward movement of the ejector. The stops 7 and 8 limit the movement of the disc 10 in the opposite direction, that is, the stops prevent the disc 10 from being disengaged from the top of the tubular member.

From the foregoing description of the various parts of the device the operation thereof may be readily understood. The device is grasped and manipulated by one hand of the operator. Two fingers of the hand are inserted under the handle and straddle the rod 9. During the cutting of the layer of dough C (Figure 3), the thumb of the operating hand is placed on the handle 4 and is used for guiding and forcing the tubular member 1 into the dough. This will leave the disc 10 free to move upwardly.

The cutting edge 3 will sever a portion C' of the dough from the remainder, and this portion will be slightly compressed as it enters the tubular member 1 due to the chamfered area 2. The space around the disc 10 permits air to pass thereby when cutting the dough. The biscuit thus formed will have sufficient elasticity to frictionally engage with the cutter wall and be retained in the cutter, while the latter is lifted from the dough. In the event that the cut biscuit should have any tendency to fall out when the operator starts to lift the cutter, the cutter may be returned immediately to the supporting surface 13 and the knob 11 depressed. This will compress the cut dough C' and spread it so that its periphery will frictionally engage with the member 1 and be supported thereby when the device is lifted.

The device is now lifted and moved to the pan or other article that is to receive the cut biscuits. The operator positions the device over the pan in the exact place where the biscuit is to be deposited, and the knob 11 is then depressed with the thumb. This will move the rod 9 and the disc 10 downwardly to eject the biscuit. The entire operation of cutting the biscuit and freeing it from the cutter is accomplished with one hand, and there is no need to touch the biscuit from the time it is formed from the dough until it is deposited in the pan.

Although I have described the cutting of biscuits, I do not wish to be limited in this respect, since cookies and the like may be cut with my device with equal facility and ease.

I claim:

1. A biscuit cutting device comprising a tubular member having its inner surface disposed adjacent to its lower edge chamfered to provide a cutting edge that has a straight outer wall that will cut a perfect cylindrical opening in the biscuit dough and an inclined inner surface that will press the periphery of the cut biscuit inwardly to a sufficient extent to cause it to adhere to the inner wall of the tubular member and be lifted when the tubular member is lifted, a U-shaped handle for the tubular member large enough to receive two fingers of the operator's hand, a lightweight plunger rod slidably carried by the handle and extending into the tubular member, a light weight non-perforated disc secured to the rod and being movable in the tubular member, the periphery of the disc being spaced inwardly from the inner wall of the tubular member for providing an annular air space, and a light weight knob secured to the free end of the rod and contacting with the handle for limiting the downward movement of the disc in the tubular member.

2. A biscuit cutting device entirely manipulated with one hand and comprising a hollow dough cutting member having its lower cutting edge chamfered on the inner side for forming an inclined inner surface portion that will press the periphery of the cut biscuit inwardly for gripping the dough with sufficient force to lift and support it when the member is lifted, a U-shaped handle secured to the open top of the member for lifting it; a light weight dough ejector consisting of a non-perforated light weight disc, a light weight rod secured to the disc and slidably received in the handle, and a light weight knob mounted on the rod, the frictional engagement of the dough with the member being sufficient to support the light weight dough ejector in raised position in the member, the periphery of the disc being spaced a slight distance in from the inner surface of the member to permit its ready movement in the member, the dough being ejected when the knob is depressed by the thumb of the hand that controls the device, the knob being raised above the handle when the member is forced into a layer of dough only a distance equal to the thickness of the layer.

BARTON R. EDWARDS.